(12) United States Patent
Draper

(10) Patent No.: US 11,831,099 B2
(45) Date of Patent: Nov. 28, 2023

(54) MODULAR ELECTRICAL OUTLET ASSEMBLY

(71) Applicant: Billy Draper, Haslet, TX (US)

(72) Inventor: Billy Draper, Haslet, TX (US)

( * ) Notice: Subject to any disclaimer, the term of this patent is extended or adjusted under 35 U.S.C. 154(b) by 135 days.

(21) Appl. No.: 17/572,987

(22) Filed: Jan. 11, 2022

(65) Prior Publication Data

US 2023/0223719 A1     Jul. 13, 2023

(51) Int. Cl.
   *H02G 3/16*     (2006.01)
   *H01R 25/00*    (2006.01)
   *H01R 13/514*   (2006.01)
   *H01R 13/73*    (2006.01)

(52) U.S. Cl.
   CPC ........... *H01R 13/514* (2013.01); *H01R 13/73* (2013.01); *H01R 25/006* (2013.01); *H02G 3/16* (2013.01)

(58) Field of Classification Search
   CPC .... H01R 13/514; H01R 13/73; H01R 25/006; H02G 3/16
   See application file for complete search history.

(56) References Cited

U.S. PATENT DOCUMENTS

| | | |
|---|---|---|
| 4,166,934 A | 9/1979 | Marrero |
| 4,636,914 A | 1/1987 | Belli |
| 4,958,048 A | 9/1990 | Bell |
| 6,939,179 B1* | 9/2005 | Kieffer, Jr. ............. H01R 27/00 439/724 |
| 7,160,147 B1* | 1/2007 | Stephan ................. H01R 29/00 439/535 |
| 7,255,596 B2 | 8/2007 | Pyrros |
| D568,253 S | 5/2008 | Gorman |
| 7,425,677 B2* | 9/2008 | Gates ................... H01R 12/675 174/59 |
| 7,690,949 B2 | 4/2010 | Binder |
| 8,714,989 B2 | 5/2014 | Keswani |
| 9,653,860 B2 | 5/2017 | Hestrin |
| 9,917,431 B2* | 3/2018 | Moss ....................... H02G 3/16 |
| 10,637,223 B2* | 4/2020 | Newill .................. H02G 3/121 |
| 2002/0185296 A1* | 12/2002 | Schultz .................... H02G 3/14 174/53 |

FOREIGN PATENT DOCUMENTS

WO    WO2016179409    11/2016

* cited by examiner

*Primary Examiner* — Michael C Zarroli

(57) ABSTRACT

A modular electrical outlet assembly includes an enclosure that can be installed in a wall of a room. The enclosure has a plurality of wiring terminals that can each be electrically coupled to electrical wiring in the room. The enclosure has a plurality of integral output sockets. Each of the output sockets is in electrical communication with a respective one of the wiring terminals to receive electrical current from the electrical wiring. A module is insertable into the enclosure and the module has a plurality of integral input terminals. Each of the input terminals electrically engages a respective one of the output sockets in the enclosure when the module is inserted into the enclosure to receive electrical current from the electrical wiring in the wall.

17 Claims, 7 Drawing Sheets

MODULAR ELECTRICAL OUTLET ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to electrical outlet devices and more particularly pertains to a new electrical outlet device for facilitating a user with limited knowledge and tools to replace an electrical outlet.

(2) Description of Related Art Including Information Disclosed Under 37 CFR 1.97 and 1.98

The prior art relates to electrical outlet devices including a variety of modular electrical outlets that include sockets and prongs that engage respective sockets to facilitate a user with limited skill and tools to replace an electrical outlet.

BRIEF SUMMARY OF THE INVENTION

An embodiment of the disclosure meets the needs presented above by generally comprising an enclosure that can be installed in a wall of a room. The enclosure has a plurality of wiring terminals that can each be electrically coupled to electrical wiring in the room. The enclosure has a plurality of output sockets each being integrated therein. Each of the output sockets is in electrical communication with a respective one of the wiring terminals to receive electrical current from the electrical wiring. A module is insertable into the enclosure and the module has a plurality of input terminals that is each integrated therein. Each of the input terminals electrically engages a respective one of the output sockets in the enclosure when the module is inserted into the enclosure to receive electrical current from the electrical wiring in the wall.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
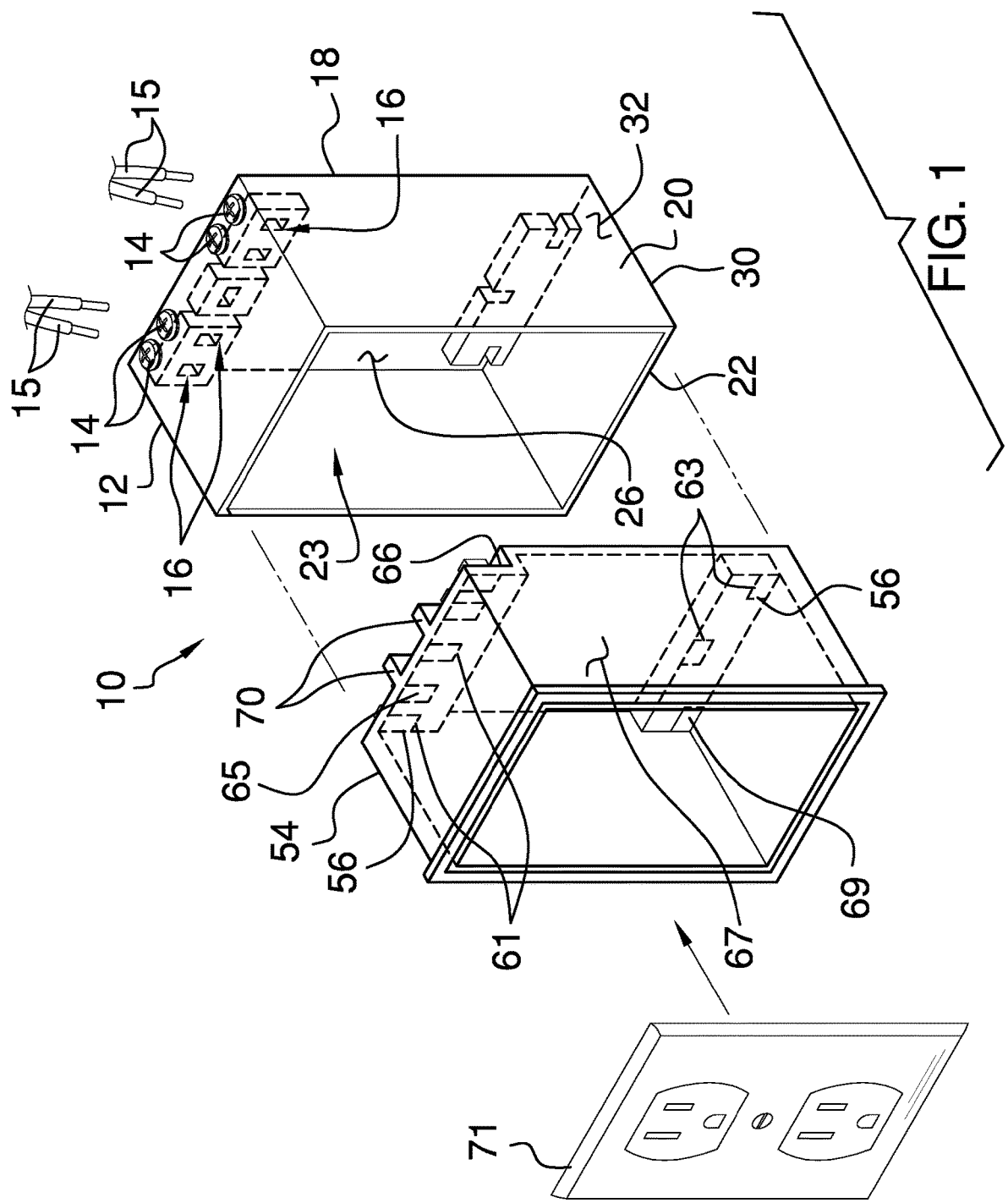
FIG. 1 is an exploded perspective view of a modular electrical outlet assembly according to an embodiment of the disclosure.
Figure 2:
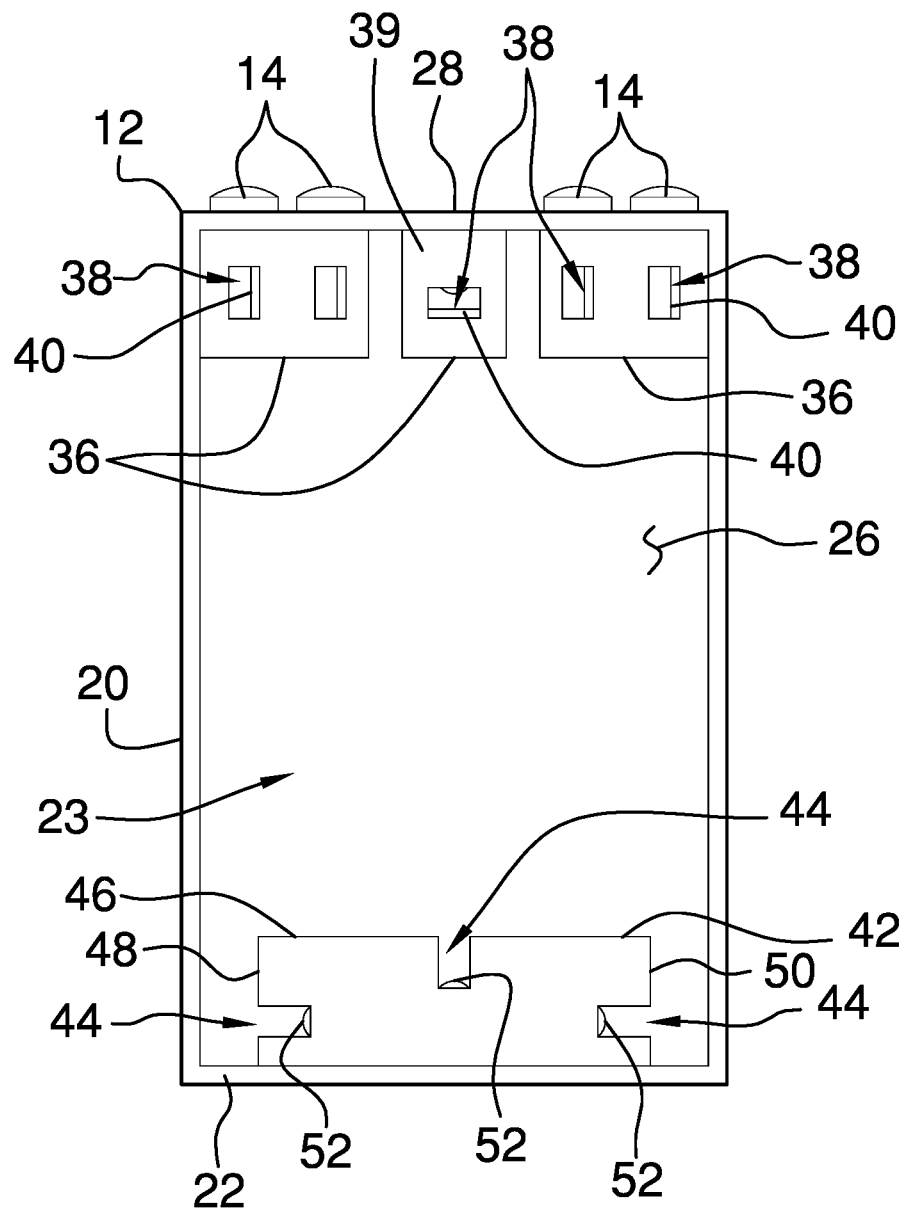
FIG. 2 is a front view of an enclosure embodiment of the disclosure.
Figure 3:
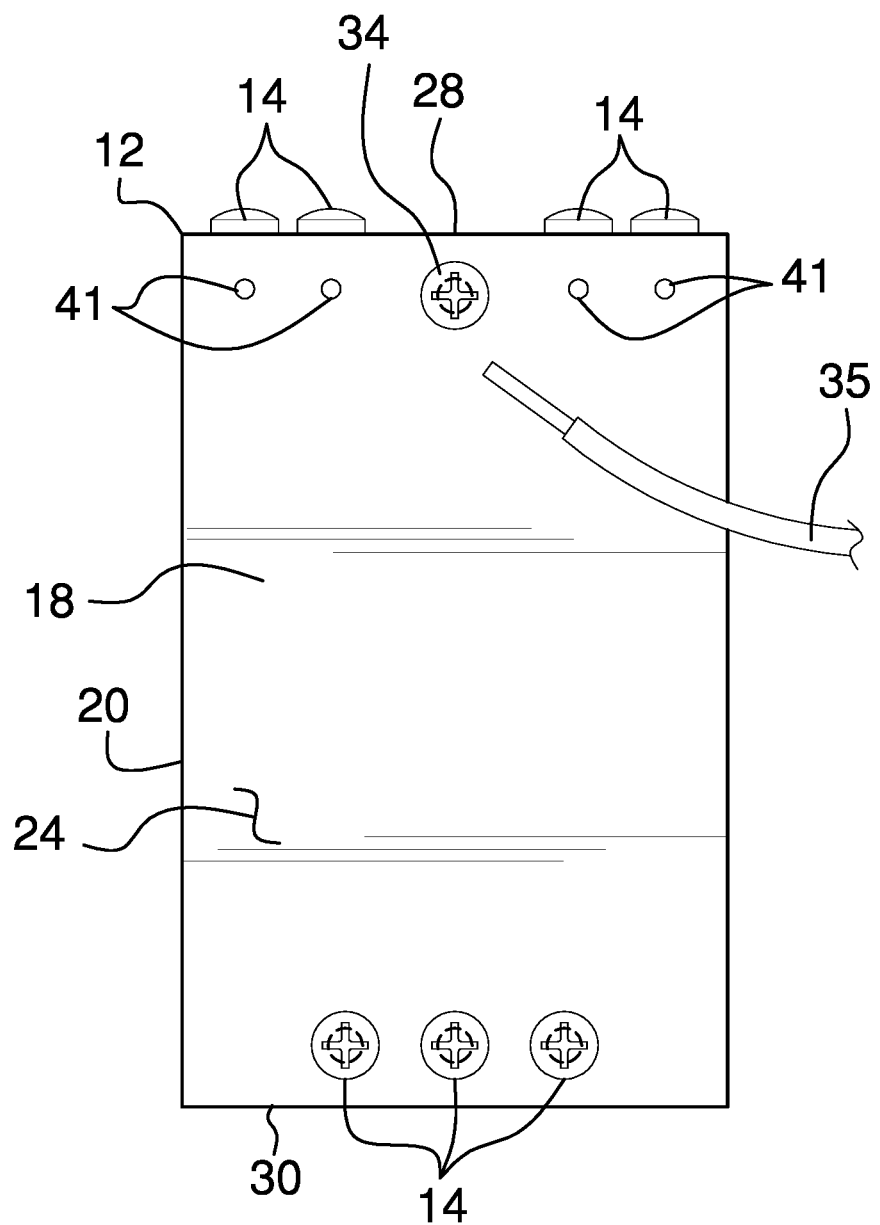
FIG. 3 is a back view of an enclosure of an embodiment of the disclosure.
Figure 4:
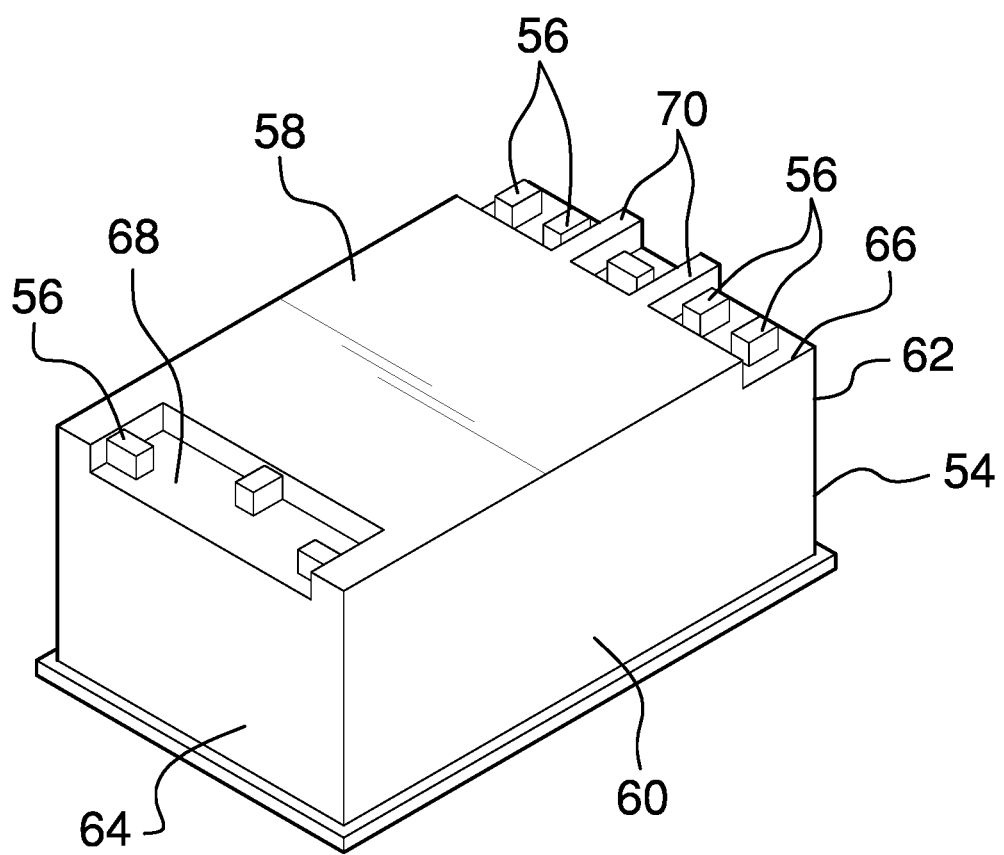
FIG. 4 is a back perspective view of a module of an embodiment of the disclosure.
Figure 5:
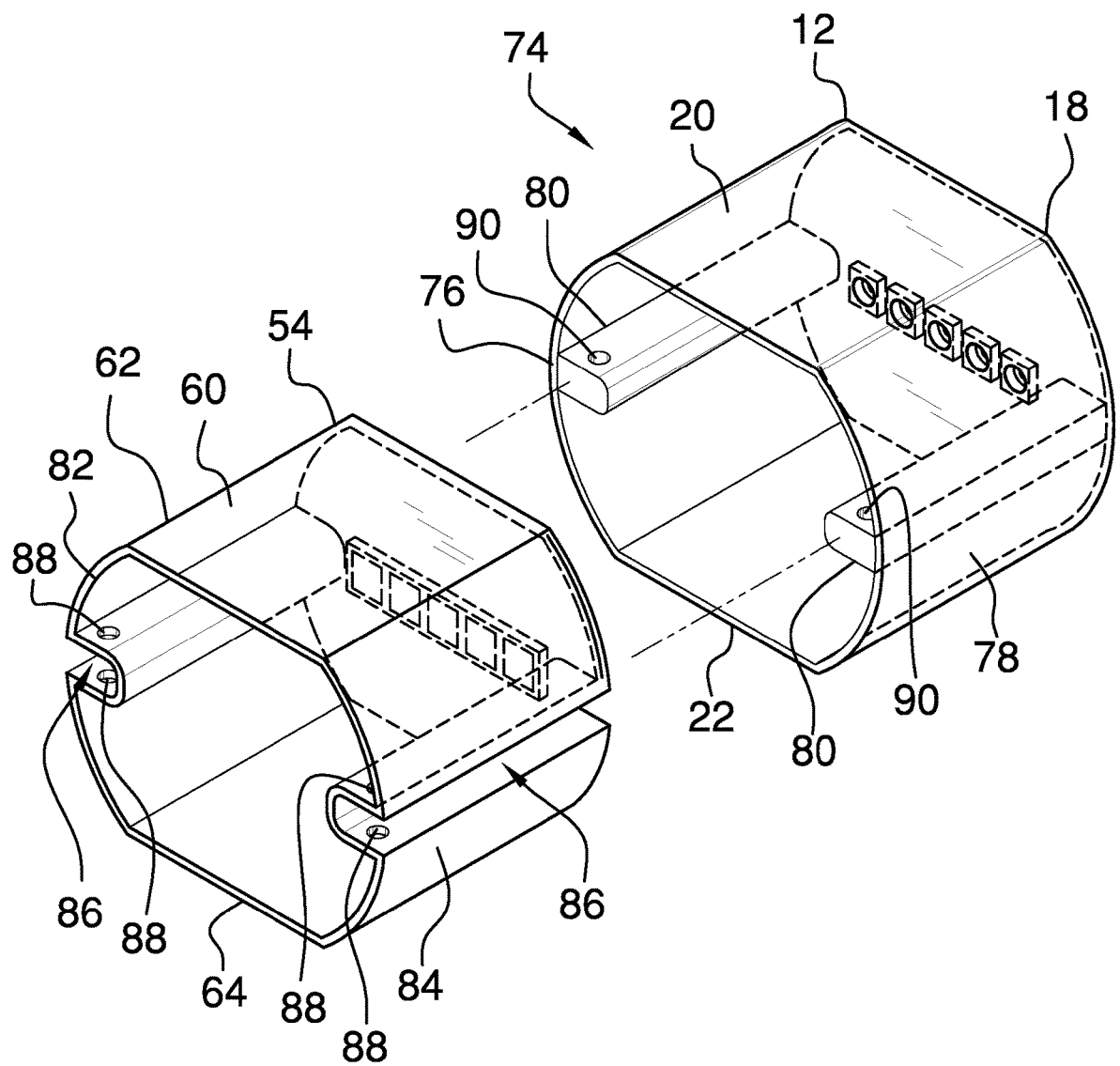
FIG. 5 is an exploded perspective view of an alternative embodiment of the disclosure.
Figure 6:
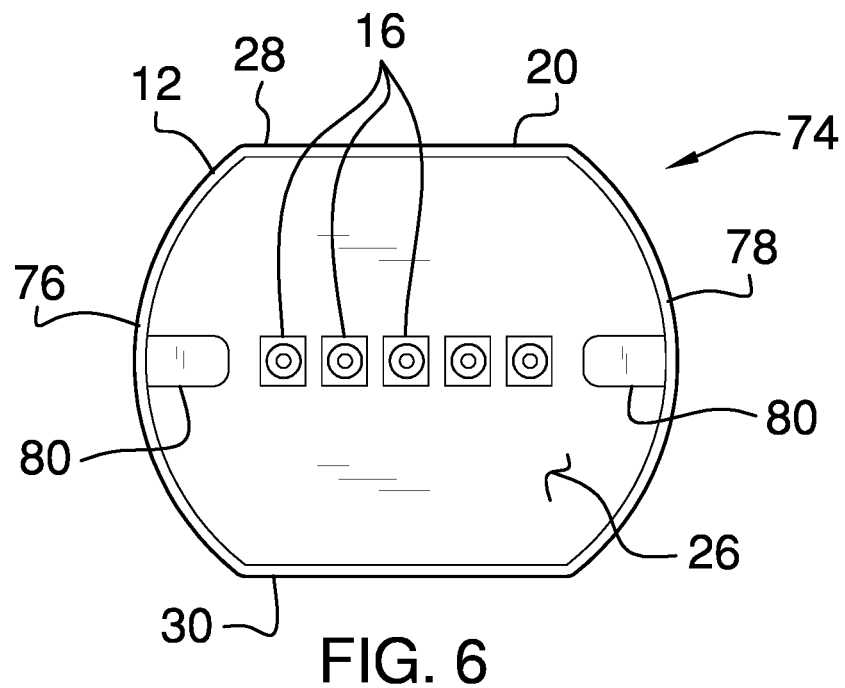
FIG. 6 is a front view of an enclosure of an alternative embodiment of the disclosure.
Figure 7:
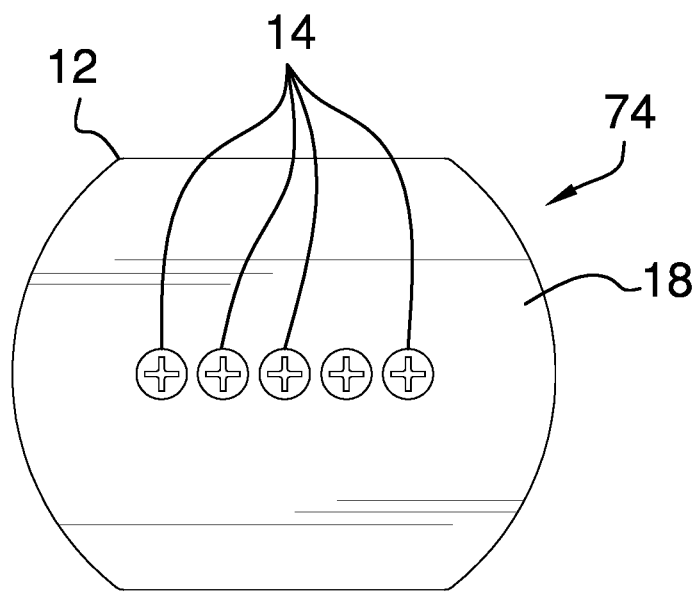
FIG. 7 is a back view of an enclosure of an alternative embodiment of the disclosure.
Figure 8:
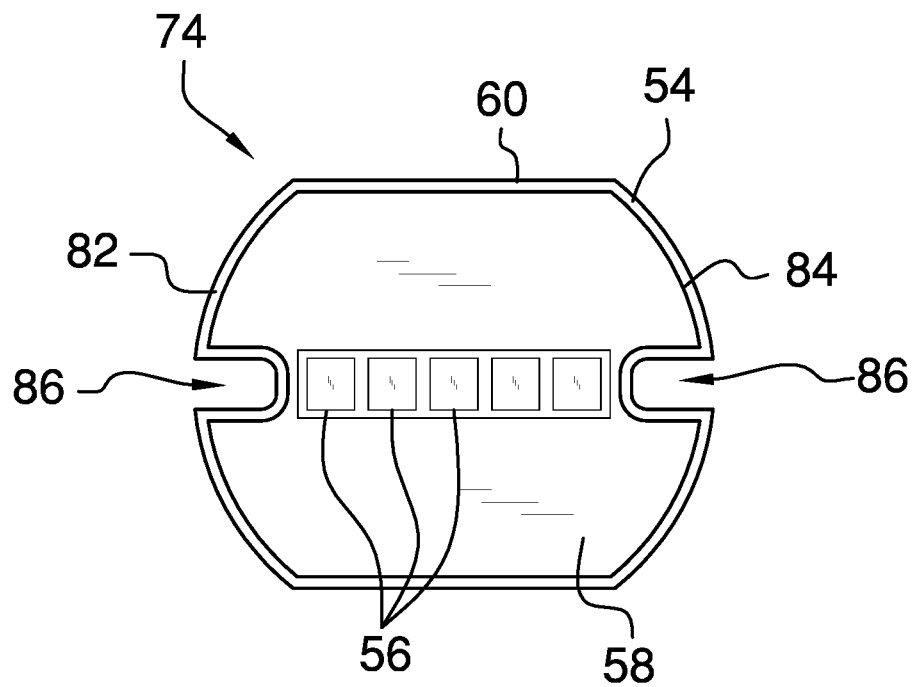
FIG. 8 is a front view of a module of an alternative embodiment of the disclosure.
Figure 9:
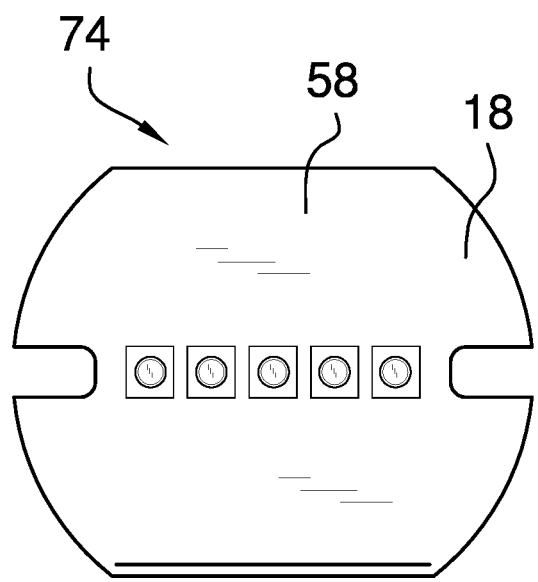
FIG. 9 is a back view of module of an alternative embodiment of the disclosure.

With reference now to the drawings, and in particular to FIGS. 1 through 9 thereof, a new electrical outlet device embodying the principles and concepts of an embodiment of the disclosure and generally designated by the reference numeral 10 will be described.

As best illustrated in FIGS. 1 through 9, the modular electrical outlet assembly 10 generally comprises an enclosure 12 that can be installed in a wall of a room. The room may be a room in a house, an office or any other type of occupancy. The enclosure 12 has a plurality of wiring terminals 14 and each of the wiring terminals 14 can be electrically coupled to electrical wiring 15 in the room. Additionally, the enclosure 12 has a plurality of output sockets 16 each being integrated therein. Each of the output sockets 16 is in electrical communication with a respective one of the wiring terminals 14 to receive electrical current from the electrical wiring 15. The enclosure 12 is comprised of an electrically insulating material, such as plastic or the like, that conforms to the requirements of the National Electrical Code for residential and commercial electrical wiring 15.

The enclosure 12 has a rear wall 18 and an outer wall 20 extending forwardly therefrom, and the outer wall 20 has a distal edge 22 with respect to the rear wall 18 to define an opening 23 into the enclosure 12. The rear wall 18 has a back surface 24 and a front surface 26, and the outer wall 20 has a top side 28, a bottom side 30 and an outer surface 32. The outer surface 32 of the top side 28 of the outer wall 20 has respective ones of the wiring terminals 14 positioned thereon. Additionally, the back surface 24 of the rear wall 18 has respective ones of the wiring terminals 14 positioned thereon. The back surface 24 of the rear wall 18 has a ground terminal 34 positioned thereon and the ground terminal 34 can be electrically coupled to a ground wire 35 of the electrical wiring 15. Each of the wiring terminals 14 may be threaded fasteners, such as Phillips screws or the like, that are common to existing electrical fixtures. Each of the wiring terminals 14 is comprised of an electrically conductive material, and the ground terminal 34 is in electrical communication with respective output sockets 16, and the ground terminal 34 may comprise a threaded fastener.

The front surface 26 of the rear wall 18 has a plurality of first blocks 36 each being positioned thereon. Each of the first blocks 36 has a recess 38 extending into a front face 39 of a respective first block 36 to define a respective one of the output sockets 16. Moreover, the recess 38 in each of the first blocks 36 has a contact 40 integrated therein. The contact 40 in the recess 38 in each of the first blocks 36 is in electrical communication with a respective one of the wiring terminals 14 on the top side 28 of the outer wall 20 or the ground terminal 34. Additionally, each of the first blocks 36 is aligned with the top side 28 of the outer wall 20. The rear wall 18 has a plurality of holes 41 extending therethrough and each of the holes 41 is aligned with the recess 38 in a respective one of the first blocks 36. Each of the holes 41 can insertably receive the electrical wiring 15 to facilitate the electrical wiring 15 to be in electrical communication with the contact 40 in the recess 38 in each of the first blocks 36.

The front surface 26 of the rear wall 18 has a second block 42 positioned thereon and the second block 42 has a plurality of notches 44 each extending into a respective top surface 46, first lateral surface 48 or second lateral surface 50 of the second block 42 to define a respective one of the output sockets 16. Each of the notches 44 has a contact 52 integrated therein and the contact 52 in each of the notches 44 is in electrical communication with a respective one of the wiring terminals 14 on the rear wall 18. Moreover, the second block 42 is aligned with the bottom side 30 of the outer wall 20. The contact 52 in each of the notches 44 is comprised of an electrically conductive material.

A module 54 is provided and the module 54 is insertable into the enclosure 12 to accommodate a female electrical outlet or any other type of electrical fixture that might be commonly employed in the occupancy. The module 54 has a plurality of input terminals 56 each being integrated therein. Additionally, each of the input terminals 56 electrically engages a respective one of the output sockets 16 in the enclosure 12 when the module 54 is inserted into the enclosure 12. In this way each of the input terminals 56 can receive electrical current from the electrical wiring 15 in the wall. Each of the input terminals 56 is comprised of an electrically conductive material.

The module 54 has a back wall 58 and an outside wall 60 extending forwardly therefrom, and the outside wall 60 has an upper side 62 and a lower side 64. The back wall 58 has a first depression 66 extending toward the distal edge 22 of the outside wall 60 and the first depression 66 is aligned with the upper side 62 of the outside wall 60. The back wall 58 has a second depression 68 extending toward the distal edge 22 of the outside wall 60 and the second depression 68 is aligned with the lower side 64 of the outside wall 60. The back wall 58 has a pair of tabs 70 each extending rearwardly away therefrom and each of the tabs 70 is positioned in the first depression 66. Moreover, each of the tabs 70 is positioned between respective ones of the first blocks 36 in the enclosure 12 when the module 54 is inserted into the enclosure 12 for aligning the module 54 with the enclosure 12.

Each of the input terminals 56 is integrated into and extends rearwardly away from the back wall 58 of the module 54. The plurality of input terminals 56 includes a set of first input terminals 61 and a set of second input terminals 63. Each of the first input terminals 61 is positioned in the first depression 66. Moreover, each of the first input terminals 61 extends into a respective recess 38 in a respective one of the first blocks 36 when the module 54 is inserted into the enclosure 12. Thus, each of the first input terminals 61 is in electrical communication with the contact 40 in the recess 38 in the respective first block 36 to receive electrical current from the electrical wiring 15. Additionally, each of the first input terminals 61 has a forward face 65 that is exposed in an inside surface 67 of the back wall 58 of the module 54. In this way the forward face 65 of each of the first input terminals 61 can electrically engage an electrical device 71 that is installed in the module 54. The electrical device 71 may be a female electrical outlet, an electrical switch, a smart device or any other type of electrical device that would commonly be wired into the room.

Each of the second input terminals 63 is positioned in the second depression 68. Each of the second input terminals 63 extends into a respective notch 44 in the second block 42 when the module 54 is inserted into the enclosure 12. Thus, each of the second input terminals 63 is in electrical communication with the contact 52 in a respective notch 44 in the second block 42 to receive electrical current from the electrical wiring 15. Each of the second input terminals 63 has a forward face 69 that is exposed in the inside surface 67 of the back wall 58 of the module 54. In this way the forward face 69 of each of the second input terminals 63 can electrically engage the electrical device 71 that is installed in the module 54.

In an alternative embodiment 74 as is shown in FIGS. 5 through 9, the outer wall 20 of the enclosure 12 has a first lateral side 76 and a second lateral side 78. Each of the first lateral side 76 and the second lateral side 78 curves outwardly between the top side 28 and the bottom side 30. Thus, the enclosure 12 is structured to resemble a conventional ceiling box for a light fixture. Additionally, each of the output sockets 16 may distributed along the front surface 26 of the rear wall 18 of the enclosure 12. Continuing in the alternative embodiment 74, the enclosure 12 includes a pair of rails 80 and each of the rails 80 is positioned on a respective one of the first lateral side 76 and the second lateral side 78 of the enclosure 12. Each of the rails 80 extends between the distal edge 22 of the outer wall 20 of the enclosure 12 and the rear wall 18 of the enclosure 12.

Continuing in the alternative embodiment 74, the outside wall 60 of the module 54 has a first sidelong side 82 and a second sidelong side 84, and each of the first sidelong side 82 and the second sidelong side 84 curves outwardly between the upper side 62 and the lower side 64. In this way the module 54 can accommodate a light fixture that is mounted to a ceiling. Each of the first sidelong side 82 and the second sidelong side 84 has a groove 86 integrated therein. Additionally, the groove 86 in each of the first sidelong side 82 and the second sidelong side 84 extends between the distal edge 22 of the outside wall 60 and the back wall 58. The groove 86 in each of the first sidelong side 82 and the second sidelong side 84 slidably receives a respective one of the rails 80 when the module 54 is inserted into the enclosure 12. Additionally, each of the input terminals 56 is distributed along back wall 58 of the module 54.

Each of the first sidelong side 82 and the second sidelong side 84 has a pair of holes 88 each extending therethrough, and each of the holes 88 in each of the first sidelong side 82 and the second sidelong side 84 is aligned with each other along a respective one of the grooves 86. Each of the rails 80 has a hole 90 extending therethrough, and each of the holes 90 in the rails 80 is aligned with a respective pair of holes 88 in the first sidelong side 82 and the second sidelong side 84 when the module 54 is inserted into the enclosure 12. In this way pins can be inserted through the holes 88 associated with the module 54 and the holes in the rails 80 for retaining the module 54 in the enclosure 12.

In use, the enclosure 12 is mounted in the wall in the same manner as conventional outlet boxes or light switch boxes and each of the wiring terminals 14 is electrically coupled to the electrical wiring 15 in the wall in accordance with the National Electrical Code by a trained electrician. The module 54 is insertable into the enclosure 12 such that each of the input terminals 56 electrically engages respective output sockets 16 in the enclosure 12. In this way each of the input terminals 56 is in electrical communication with the electrical wiring 15 in the wall. Thus, the electrical device 71, such as a female electrical outlet, a light switch, a smart device of any other type of electrical device, can be installed in the module 54 by a person with limited electrical knowledge and limited tools. Moreover, the electrical device 71 facilitates electrical communication between the first input terminals 61 and the second input terminals 63 depending on the wiring method employed to install the electrical device 71. As is shown in the alternative embodiment 74, the module 54 can be installed in a ceiling to accommodate an electrical fixture that would typically be used in a ceiling.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A modular electrical outlet assembly for facilitating an electrical outlet to be installed without tools or knowledge of electrical wiring, said assembly comprising:
   an enclosure being configured to be installed in a wall of a room, said enclosure having a plurality of wiring terminals wherein each of said wiring terminals is configured to be electrically coupled to electrical wiring in the room, said enclosure having a plurality of output sockets each being integrated therein, each of said output sockets being in electrical communication with a respective one of said wiring terminals wherein each of said output sockets is configured to receive electrical current from the electrical wiring;
   a module being insertable into said enclosure, said module having a plurality of input terminals each being integrated therein, each of said input terminals electrically engaging a respective one of said output sockets in said enclosure when said module is inserted into said enclosure wherein each of said input terminals is configured to receive electrical current from the electrical wiring in the wall;
   wherein said enclosure has a rear wall and an outer wall extending, forwardly therefrom, said outer wall having a distal edge with respect to said rear wall to define an opening into said enclosure, said rear wall having a back surface and a front surface, said outer wall having a top side, a bottom side and an outer surface;
   wherein said outer surface of said top side of said outer wall as respective ones of said wiring terminals being positioned thereon;
   wherein said back surface of said rear wall has respective ones of said wiring terminals being positioned thereon; and
   wherein said back surface of said rear wall has a ground terminal being positioned thereon wherein said ground terminal is configured to be electrically coupled to a ground wire of the electrical wiring.

2. The assembly according to claim 1, wherein said front surface of said rear wall has a plurality of first blocks each being positioned thereon, each of said first blocks having a recess extending into a front face of a respective first block to define a respective one of said output sockets, each of said first blocks being aligned with said top side of said outer wall.

3. The assembly according to claim 2, wherein said recess in each of said first blocks has a contact being integrated therein, said contact in said recess in each of said first blocks being in electrical communication with a respective one of said wiring terminals on said top side of said outer wall or said ground terminal.

4. The assembly according to claim 1, wherein:
   said front surface of said rear wall has a plurality of first blocks positioned thereon; and
   said front surface of said rear wall has a second block positioned thereon, said second block having a plurality of notches each extending into a respective top surface, first lateral surface or second lateral surface of said second block to define a respective one of said output sockets.

5. The assembly according to claim 4, wherein each of said notches has a contact being integrated therein, said contact in each of said notches being in electrical communication with a respective one of said wiring terminals on said rear wall, said second block being aligned with said bottom side of said outer wall.

6. The assembly according to claim 1, Wherein said module has a back wall and an outside wall extending forwardly therefrom, said outside wall having an upper side and a lower side, said back wall having a first depression extending toward said distal edge of said outside wall, said first depression being aligned with said upper side of said outside wall.

7. The assembly according to claim 6, wherein said back wall has a second depression extending toward said distal edge of said outside wall, said second depression being aligned with said lower side of said outside wall.

8. The modular electrical outlet assembly according to claim 1, said assembly further comprising:

said front surface of said rear wall having a plurality of first blocks each being positioned thereon, each of said first blocks having a recess extending into a front face of a respective first block to define a respective one of said output sockets, said recess in each of said first blocks having a contact being integrated therein, said contact in said recess in each of said first blocks being in electrical communication with a respective one of said wiring terminals on said top side of said outer wall or said ground terminal, each of said first blocks being aligned with said top side of said outer wall, said front surface of said rear wall having a second block positioned thereon, said second block having a plurality of notches each extending into a respective top surface, first lateral surface or second lateral surface of said second block to define a respective one of said output sockets, each of said notches having a contact being integrated therein, said contact in each of said notches being in electrical communication with a respective one of said wiring terminals on said rear wall, said second block being aligned with said bottom side of said outer wall; and said module being insertable into said enclosure wherein said module is configured to accommodate an female electrical outlet, said module having a plurality of input terminals each being integrated therein, said module having a back wall and an outside wall extending forwardly therefrom, said outside wall having an upper side and a lower side, said back wall having a first depression extending toward said distal edge of said outside wall, said first depression being aligned with said upper side of said outside wall, said back wall having a second depression extending toward said distal edge of said outside wall, said second depression being aligned with said lower side of said outside wall, said back wall having a pair of tabs each extending rearwardly away therefrom, each of said tabs being positioned in said first depression, each of said tabs being positioned between respective ones of said first blocks in said enclosure when said module is inserted into said enclosure for aligning said module with said enclosure, each of said input terminals being integrated into and extending rearwardly away from said back wall of said module, said plurality of input terminals including a set of first input terminals and a set of second input terminals, each of said first input terminals being positioned in said first depression, each of said first input terminals extending into a respective recess in a respective one of said first blocks when said module is inserted into said enclosure such that each of said first input terminals is in electrical communication with said contact in said recess in said respective first block wherein each of said first input terminals is configured to receive electrical current from the electrical wiring, each of said first input terminals having a forward face being exposed in an inside surface of said back wall of said module wherein said forward face of each of said first input terminals is configured to electrically engage an electrical outlet that is installed in said module, each of said second input terminals being positioned in said second depression, each of said second input terminals extending into a respective notch in a respective one of said second blocks when said module is inserted into said enclosure such that each of said second input terminals is in electrical communication with said contact in a respective notch in said second block wherein each of said second input terminals is configured to receive electrical current from the electrical wiring, each of said second input terminals having a forward face being exposed in said inside surface of said back wall of said module wherein said forward face of each of said second input terminals is configured to electrically engage an electrical outlet that is installed in said module.

9. The assembly according to claim 8, wherein:

said outer wall of said enclosure has a first lateral side and a second lateral side, each of said first lateral side and said second lateral side curving outwardly between said top side and said bottom side;

each of said output sockets is distributed along said front surface of said rear wall of said enclosure; and said enclosure includes a pair of rails, each of said rails being positioned on a respective one of said first lateral wall and said second lateral wall of said enclosure, each of said rails extending between said distal edge of said outer wall of said enclosure and said rear wall of said enclosure.

10. The assembly according to claim 9, wherein said outside wall of said module has a first sidelong side and a second sidelong side, each of said first sidelong side and said second sidelong side curving outwardly between said upper side and said lower side wherein said module is configured to accommodate a light fixture mounted to a ceiling, each of said first sidelong side and said second sidelong side having a groove being integrated therein, said groove in each of said first sidelong side and said second sidelong side extending between said distal edge of said outside wall and said back wall, said groove in each of said first sidelong side and said second sidelong side slidably receiving a respective one of said rails when said module is inserted into said enclosure.

11. The assembly according to claim 9, wherein each of said input terminals is distributed along back wall of said module.

12. A modular electrical outlet assembly for facilitating an electrical outlet to be installed without tools or knowledge of electrical wiring, said assembly comprising:

an enclosure being configured to be installed in a wall of a room, said enclosure having a plurality of wiring terminals wherein each of said wiring terminals is configured to be electrically coupled to electrical wiring in the room, said enclosure having a plurality of output sockets each being integrated therein, each of said output sockets being in electrical communication with a respective one of said wiring terminals wherein each of said output sockets is configured to receive electrical current from the electrical wiring;

a module being insertable into said enclosure, said module having a plurality of input terminals each being integrated therein, each of said input terminals electrically engaging a respective one of said output sockets in said enclosure when said module is inserted into said enclosure wherein each of said input terminals is configured to receive electrical current from the electrical wiring in the wall;

wherein said module has a back wall and an outside wall extending forwardly therefrom, said outside wall having an upper side and a lower side, said back wall having a first depression extending toward said distal edge of said outside wall, said first depression being aligned with said upper side of said outside wall;

wherein said enclosure has a plurality of first blocks being positioned therein; and wherein said back wall has a pair of tabs each extending rearwardly away therefrom, each of said tabs being positioned in said first depression, each of said tabs being positioned between respective ones of said first blocks in said enclosure when said module is inserted into said enclosure for aligning said module with said enclosure.

13. A modular electrical outlet assembly for facilitating an electrical outlet to be installed without tools or knowledge of electrical wiring, said assembly comprising:

an enclosure being configured to be installed in a wall of a room, said enclosure having a plurality of wiring terminals wherein each of said wiring terminals is configured to be electrically coupled to electrical wiring in the room, said enclosure having a plurality of output sockets each being integrated therein, each of said output sockets being in electrical communication with a respective one of said wiring terminals wherein each of said output sockets is configured to receive electrical current from the electrical wiring;

a module being insertable into said enclosure, said module having a plurality of input terminals each being integrated therein, each of said input terminals electrically engaging a respective one of said output sockets in said enclosure when said module is inserted into said enclosure wherein each of said input terminals is configured to receive electrical current from the electrical wiring in the wall;

wherein said module has a back wall and an outside wall extending forwardly therefrom, said outside wall having an upper side and a lower side, said back wall having a first depression extending toward said distal edge of said outside wall, said first depression being aligned with said upper side of said outside wall;

wherein said back wall has a second depression extending toward said distal edge of said outside wall, said second depression being aligned with said lower side of said outside wall; and wherein each of said input terminals is integrated into and extends rearwardly away from said back wall of said module, said plurality of input terminals including a set of first input terminals and a set of second input terminals, each of said first input terminals being positioned in said first depression, each of said second input terminals being positioned in said second depression.

14. The assembly according to claim 9, wherein:

said enclosure has a plurality of first blocks each being positioned therein, each of said first blocks having a recess extending inwardly therein, each recess in each of said first blocks has a contact being positioned therein; and each of said first input terminals extends into a respective recess in a respective one of said first blocks when said module is inserted into said enclosure such that each of said first input terminals is in electrical communication with said contact in said recess in said respective first block wherein each of said first input terminals is configured to receive electrical current from the electrical wiring.

15. The assembly according to claim 13, wherein each of said first input terminals has a forward face being exposed in an inside surface of said back wall of said module wherein said forward face of each of said first input terminals is configured to electrically engage an electrical outlet that is installed in said module.

16. The assembly according to claim 13, wherein:

said enclosure has a plurality of first blocks each being positioned therein, each of said first blocks having a recess extending inwardly therein, each recess in each of said first blocks has a contact being positioned therein; and each of said second input terminals extends into a respective notch in said second block when said module is inserted into said enclosure such that each of said second input terminals is in electrical communication with said contact in a respective notch in said second block wherein each of said second input terminals is configured to receive electrical current from the electrical wiring.

17. The assembly according to claim 13, wherein each of said second input terminals has a forward face being exposed in an inside surface of said back wall of said module wherein said forward face of each of said second input terminals is configured to electrically engage an electrical outlet that is installed in said module.

* * * * *